Figure 1:
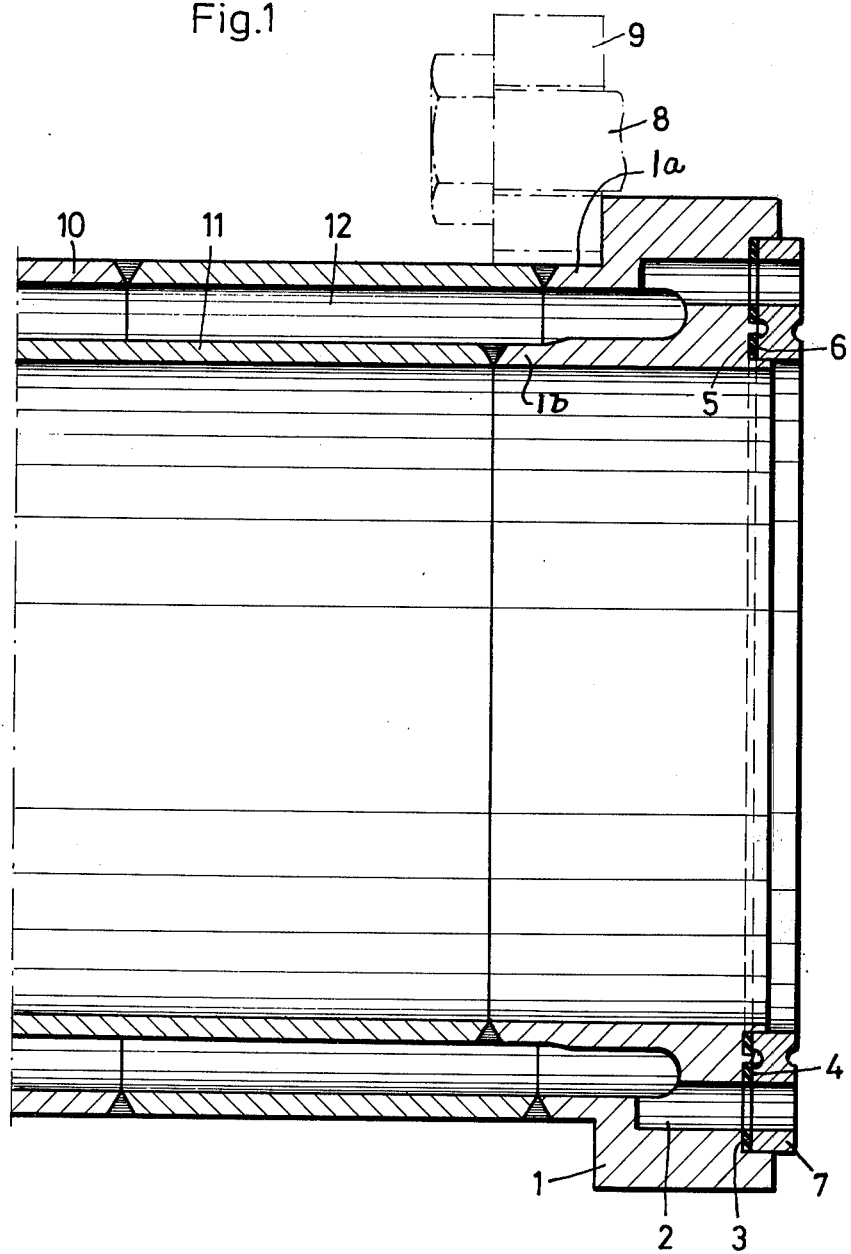

United States Patent [19]

Schulz

[11] 4,121,858
[45] Oct. 24, 1978

[54] FLANGED PIPE JOINTS

[76] Inventor: Wilhelm Schulz, Kuhleshutte 85, 4150 Krefeld, Fed. Rep. of Germany

[21] Appl. No.: 771,691

[22] Filed: Feb. 24, 1977

[30] Foreign Application Priority Data

Feb. 25, 1976 [DE] Fed. Rep. of Germany ....... 2607505
Oct. 22, 1976 [DE] Fed. Rep. of Germany ....... 2647782

[51] Int. Cl.² .............................................. F16L 39/00
[52] U.S. Cl. ................................. 285/13; 277/235 R; 285/41; 285/133 R; 285/336; 285/DIG. 18
[58] Field of Search .................. 285/133 R, 133 A, 13, 285/14, 336, DIG. 18, 41, DIG. 5

[56] References Cited

U.S. PATENT DOCUMENTS

| | | | |
|---|---|---|---|
| 1,389,768 | 9/1921 | McFarland | 285/133 R |
| 1,497,652 | 6/1924 | Browne | 285/133 R X |
| 2,260,542 | 10/1941 | Shaffer | 285/336 |
| 2,605,045 | 7/1952 | Strezynski | 285/13 X |
| 2,863,679 | 12/1958 | Dunbar | 285/336 |
| 3,317,221 | 5/1967 | Brown | 285/133 R X |
| 3,485,516 | 12/1969 | Keller et al. | 285/14 |

FOREIGN PATENT DOCUMENTS

| | | | |
|---|---|---|---|
| 1,165,716 | 6/1958 | France | 285/14 |
| 87,918 | 11/1936 | Sweden | 285/336 |
| 351,015 | 6/1931 | United Kingdom | 285/336 |

*Primary Examiner*—Thomas F. Callaghan
*Attorney, Agent, or Firm*—Cushman, Darby & Cushman

[57] ABSTRACT

The specification describes a pipe joint suitable for fluid conducting pipework in which there are inner and outer tubes defining a jacket for fluid heating or cooling medium. The joint comprises a gasket shaped to provide continuous annular seals around the inner tube and the passageways along which heating or cooling medium flows through the joint. The gasket and the pipe flanges with which the gasket cooperates define fluid-receiving channels which are located between the sealing zones around the inner tube and the passages for the heating or cooling medium so as to receive fluid which may leak past those zones and allow it to escape radially outwardly from the joint thus preventing leaked heating or cooling medium from entering the fluid stream in the inner tube, or vice versa.

3 Claims, 8 Drawing Figures

A-B

C-D

FLANGED PIPE JOINTS

This invention relates to flanged pipe joints. More particularly, the invention is concerned with the jointing of lengths of piping of a kind comprising inner and outer tubes defining between them a jacket through which fluid heating or cooling medium can be passed.

In order that fluid heating or cooling medium can flow from one length of pipe to the next, across a joint, it is necessary to provide the jointing flanges with apertures in communication with the jacket of the joined pipe lengths. It is normally necessary for some form of packing to be provided between the flanges of the joint in order to ensure the requising fluid-tight seal.

An object of the present invention is to provide pipe joint components by means of which the effective joining of jacketed pipe lengths is facilitated. In achieving this effective jointing it is aimed to seal the joint in such a way as to avoid significant risk of entry of heating or cooling medium into the stream of medium flowing along the inner tube or vice versa, in the event that some leakage of either medium does occur at the site of the joint.

To this end there is provided according to the present invention a combination of pipe joint components for use in forming a joint between heated or cooled lengths of piping of a kind comprising inner and outer tubes defining between them a jacket through which fluid heating or cooling medium can be passed; said combination comprising: an annular pipe flange component which can be connected to a first length of such piping and to a similar flange component of a second length of such piping, which pipe flange component defines a central aperture for passing material flowing along the piping inner tube, and outer apertures within the radial extent of the flange for conducting heating or cooling medium flowing along said jacket; and a sealing gasket component which is interposable between said flange component and another like flange component, which gasket component is shaped to provide an uninterrupted inner sealing zone surrounding the said central flange aperture and an uninterrupted outer sealing zone surrounding each of said outer flange apertures, said flange and gasket being formed so that when in contacting operative relationship they define between them channels which extend between the inner and each of the outer uninterrupted sealing zones and also define passageways between said outer uninterrupted sealing zones via which any fluid leaking into said channels can escape to the periphery of the flange/gasket seal.

The invention includes a combination of components as above defined together with a second pipe flange component which is clamped or adapted to be clamped, by bolting or otherwise, to the first pipe flange component with the gasket sandwiched between them to form fluid-tight seals.

The pipe flange component of a combination according to the invention may comprise a length of pipe having an integral flange with the specified features of having a said flange connected thereto, e.g., by welding. However the pipe flange component may be of ring-like form, defining the necessary central and outer apertures, for attachment by welding or otherwise to a length of any suitable jacketed piping.

The gasket component can easily be located in position for sealing and when in position the central and outer apertures (which communicate with the piping inner tube and the heating or cooling jacket respectively) are sealed from each other while at the same time there are paths via which any quantities of either medium which do leak past the seal provided for that medium can escape from the joint without entering the stream of the other medium.

In preferred embodiments of the invention, the said channels (hereafter called "fluid-receiving channels") located between the inner and each of the outer uninterrupted sealing zones, are provided by grooves in the gasket component. The portion of the face of the flange component which lies opposite such grooves is flat. The gasket has such grooves on both sides thereof so that when the gasket is clamped between two said pipe flange components, fluid-receiving channels as aforesaid are defined by the gasket and each of the pipe flange components. The said preferred features contribute to simplicity of construction and reduction of manufacturing costs.

The flange component preferably has an outer shoulder for locating the gasket component in operative position. For example the flange component may have a peripheral rim or continuous peripheral flange defining a facial recess of a diameter just sufficient to receive the gasket component.

According to another optional but particularly advantageous feature the gasket comprises an annular hub portion providing said inner uninterrupted sealing zone, and angularly spaced portions which project radially from such hub portion and provide said outer uninterrupted sealing zones, and said channels communicate with the free space between such radially projecting portions. When such gasket is clamped between the pipe flange component and a second such pipe flange component the spaces between the said radially projecting portions of the gasket provide the passageways via which any fluid leaking into said fluid-receiving channels can escape radially outwardly to the periphery of the joint. In order that such spaces shall be preserved, it is necessary for the gasket to be thick enough to keep the two pipe flange components spaced apart against the clamping pressure.

As an alternative to forming the gasket with angularly spaced radially projecting portions which provide the outer sealing zones, the gasket could be in the form of a disc having the central and outer apertures formed therein. The passageways for the escape of fluid from the aforesaid fluid-receiving channels to the periphery of the joint could in that case be provided by grooves formed in the disc and/or in the contacting face of the pipe flange component.

It is particularly recommended to form the pipe flange component with annular recesses for receiving the inner and outer sealing zones of the gasket. In order that these sealing zones can fit into such recesses the portions (hereafter called "web portions") of the gasket between such sealing zones are made thinner than the portions of the gasket constituting such sealing zones and the latter stand proud of such web portions on both sides of the gasket. The thickness of the said sealing zones of the gasket is made rather more than twice the depth of said receptive recesses. Consequently the gasket is able to keep two pipe flange components out of contact with each other against the pressure under which such components are clamped against the gasket.

In the aforesaid annular recesses (when provided) elastically deformable sealing means, such as elastically deformable sealing rings, may be provided. If no such sealing means is provided the gasket should itself be somewhat compressible in order to produce the sealing effect.

In some embodiments the gasket component is made of relatively inelastic material, preferably metal, e.g. steel. In other embodiments the gasket component is itself elastically deformable under clamping pressure. For example, the gasket component comprises a metal plate coated on both sides with sealing material.

The gasket component can with advantage have surface grooves in its sealing zones in order to improve the sealing effect. When using a coated gasket as above described, surface grooving of the coated plate tends to improve the anchorage of the coating material.

Figure 2:
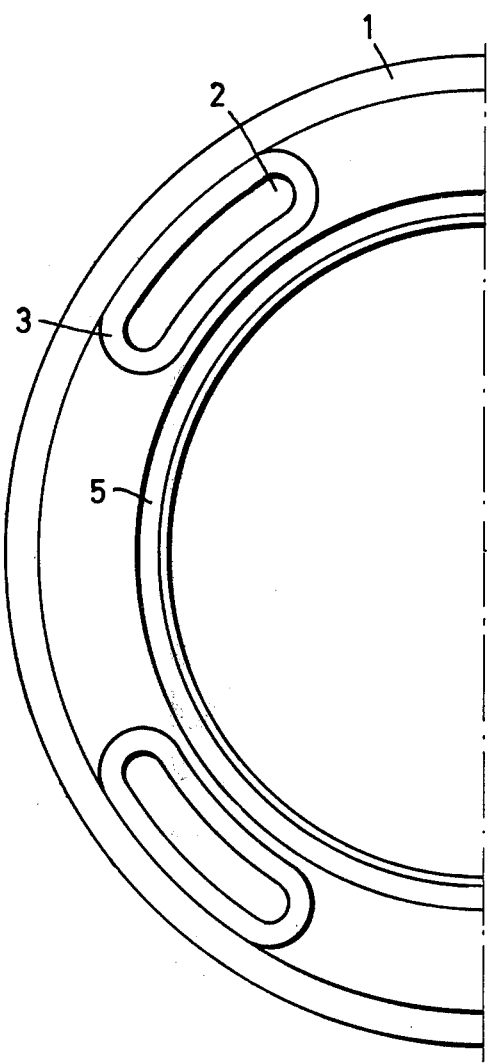
Figure 4:
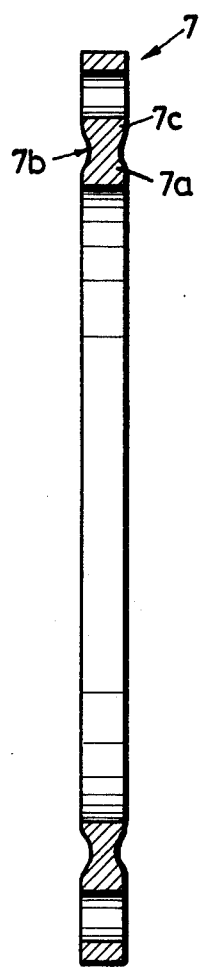
Figure 3:
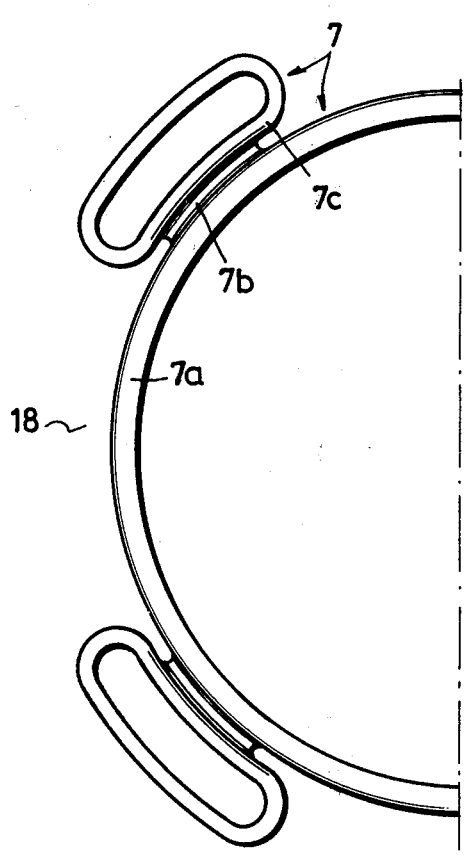
Figure 5:
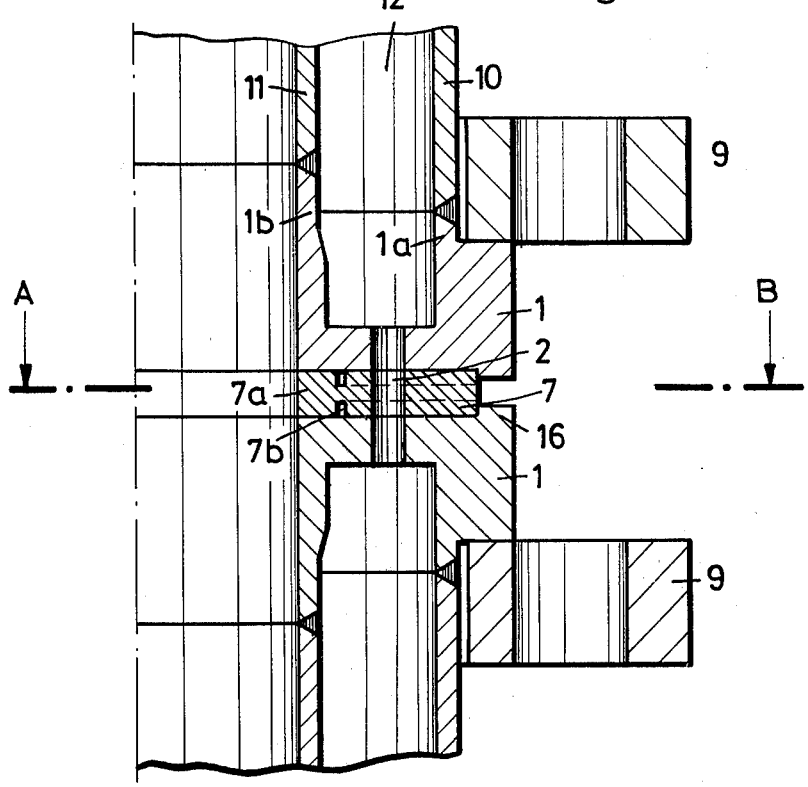
Figure 6:
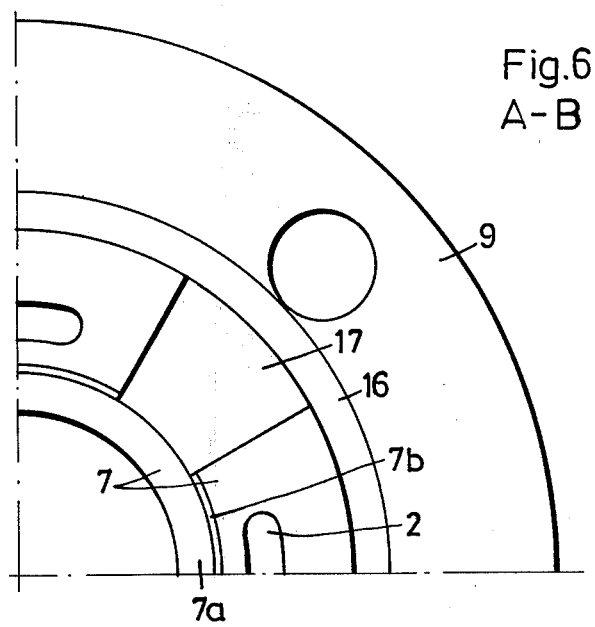
Figure 7:
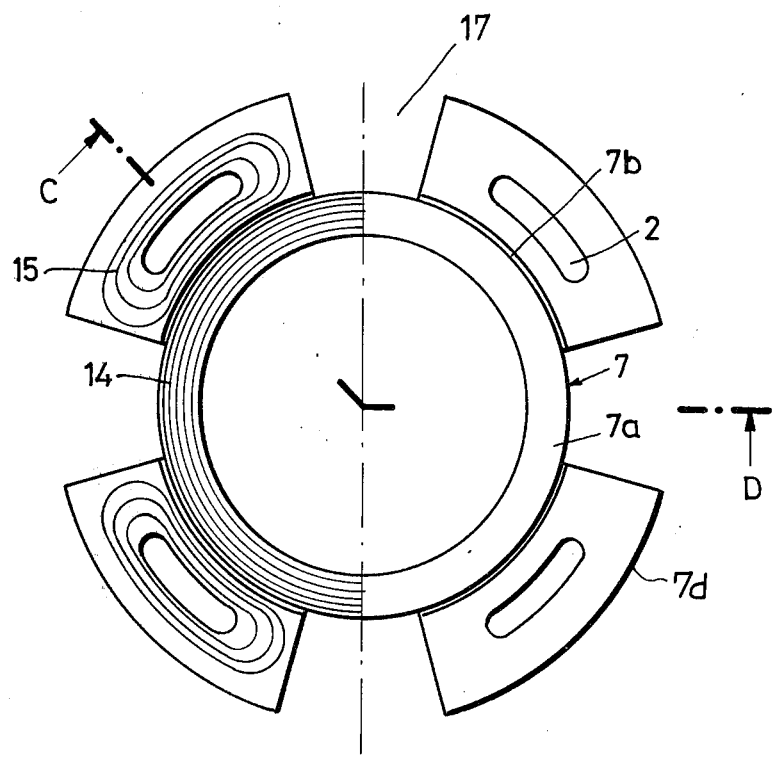
Figure 8:
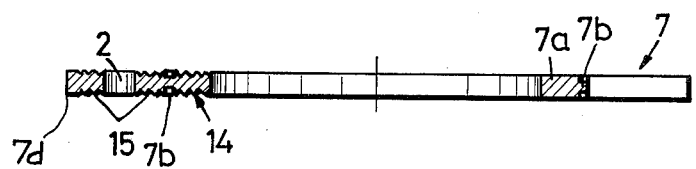

Certain embodiments of the invention, selected by way of example, will now be described with reference to the accompanying drawings, in which:

FIG. 1 is a longitudinal section through the end of a pipe fitted with a pipe flange component and gasket according to the invention, FIG. 2 is a front view of such flange component, FIG. 3 is a front view of the gasket, FIG. 4 is a transverse half-section of such gasket, FIG. 5 is a longitudinal section of part of a pipe line incorporating another form of pipe joint according to the invention, FIG. 6 is a section on line A—B in FIG. 5, FIG. 7 is a front view of the gasket used in the joint shown in FIG. 5, the left-hand half of the FIGURE showing the gasket before application of a coating thereto; and FIG. 8 is a transverse half-section of such gasket.

Referring firstly to the embodiment shown in FIGS. 1 to 4, the heated (or cooled) pipework consists of an inner tube 11 and an outer tube 10 which are arranged coaxially with one another to form the annular jacket 12. A pipe flange component 1 is welded onto the end of this pipe 10, 11 via annular portions 1a and 1b of such flange component.

The flange component has apertures or passages 2 which communicate with the interior of the jacket 12 of the pipe. The flange component is adapted to be connected by means of flange rings such as 9 and bolts such as 8, to another and similar flange component on the end of an adjoining length of pipework (not shown), the bolts being tightened to clamp a gasket 7 between the two flange components. In the completed joint the passageways 2 communicate through outer apertures in the gasket with similar passageways in the other flange component so that heating or cooling medium can flow along the pipework jacket from one pipework length to another.

The gasket 7 (see particularly FIGS. 3 and 4) includes an inner annular hub portion 7a which is connected via thinner webs 7b to outer annular portions 7c which are angularly spaced around and projected radially from the inner annulus 7a. The gasket 7 is made, e.g., of steel.

The pipe flange component 1 has an annular recess 5 surrounding its central opening, for receiving the inner annular portion 7a of the gasket, and has outer annular recesses 3, surrounding its passageways 2, for receiving said outer annular portions 7c of the gasket so that the gasket fits into the flange component as shown in FIG. 1. The widths of the said annular portions of the gasket substantially correspond with the respective receptive annular recesses.

The thickness of the gasket 7 is more than twice the depth of the said recesses and in the completed joint the gasket preserves a narrow gap between the two flange components. The annular portions 7a and 7c of the gasket provide continuous seals surrounding the central opening and the passageways 2 of the flange component.

It will be seen from FIG. 1 that due to the local reduction in the thickness of the gasket at the sites of the web portions 7b the gasket has surface grooves at these sites. These grooves form, together with the opposed face of the flange component, fluid-receiving grooves which extend across the web portions of the gasket between each outer sealing zone and the inner sealing zone. If fluid should leak past the inner zone towards one of the outer ones, or vica versa, such fluid will enter one of such grooves from which the fluid can then escape and flow radially outwardly via the spaces 18 between the angularly spaced outer sealing zones.

The number and size of the passageways 2 in the flange component are in themselves optional. However it is preferable for the passageways to extend over a substantial circumferential distance as in the embodiment illustrated in FIGS. 1 to 4, so as not significantly to restrict the flow of heating or cooling medium across the pipe joint and so that as little condensate as possible is formed in the region of such joint.

Instead of a single annular recess 5, two or more such annular recesses may be formed one within the other, the gasket 7 being then provided with a corresponding number of annular portions 7a connected together by thin webs 7b.

In the embodiment according to FIGS. 1 to 4, elastically deformable sealing material is disposed in the annular recesses 3 and 5. This sealing material forms annular sealing rings 4 and 6, such sealing material may e.g., be graphite, "Teflon" or a natural or synthetic rubber.

In FIGS. 5 to 8 parts corresponding in function with parts shown in FIGS. 1 to 4 are designated by the same reference numerals.

In the embodiment according to FIGS. 5 to 8 the gasket 7 which is located between the pipe flange components 1 has outer apertures 2 which register with the passageways 2 in the flange components. An inner annular portion 7a forms a continuous seal around the central openings of the flange components and the annular portions 7d which surround the apertures 2 in the gasket form continuous seals around the said passageways 2 in the flange components. In order that in the event of leakage of fluid into the joint from the inner tube or from the passageways 2, such fluid cannot enter into the stream of the other medium, fluid-receiving channels 7b are provided between the inner and outer sealing zones provided by the gasket portions 7a and 7d, which channels open into the spaces 17 between the said outer sealing zones. Fluid entering such channels can therefore flow radially outwardly to ambient atmosphere via said spaces 17. The aforesaid fluid-receiving channels 7b are formed by grooves in the opposed faces of the gasket.

It will be seen that in the embodiment according to FIGS. 5 to 8, the gasket 7 seats against flat faces of the flange components. The latter are simply formed with a peripheral rim or flange 16 which locates the gasket in correct position.

In a particular embodiment of the invention the gasket 7 comprises a metal plate coated on both sides with a sealing material. In order to achieve better adhesion of the sealing material to the metal plate, the metal plate may be provided with grooves 14 and 15 (FIGS. 7 and 8). The metal plate can be formed by stamping and impressing, or by machining the grooves 15 and where necessary 14, as well as the grooves 7b. The coatings on the metal plate may e.g. be graphite, "Teflon" or an elastomeric or other compressible material.

By forming the grooves 14, 15 in the sealing zones of the gasket an improved sealing effect is achieved. The clamping pressure is transmitted via a relatively small surface area, i.e. at the regions between the grooves.

By way of modification the coated plate 7 could be replaced by a gasket made entirely from a compressible sealing material, e.g. a synthetic polymeric material.

Effective pipe joints can be made relatively easily and cheaply by means of flange components according to the invention in combination with flange connectors (such as flange rings 9), which latter, even if the pipework is to be used for conveying corrosive media, may be made of cheap material since they do not come into contact with such media. Effective pipe joints according to the invention can moreover be made using relatively simple and cheap packing which in co-operation with the appropriately formed flange components produces the required sealing effect and affords security against leakage of media from the inner tube into the heating or cooling jacket or vice versa.

I claim:

1. A combination of pipe joint components for use in forming a flanged joint between heated or cooled lengths of piping of a kind comprising inner and outer tubes defining between them a passageway through which fluid heating or cooling medium can be passed; said combination comprising: an annular pipe flange component which can be connected to a first length of such piping and to a similar flange component of a second length of such piping, which pipe flange component defines a central aperture for passing material flowing along the piping inner tube, and outer apertures, angularly spaced around said central aperture, for conducting heating or cooling medium flowing along said passageway; and a sealing gasket component which is interposable between said flange component and another like flange component, which gasket has a central annular portion for providing a continuous seal around the central pipe flange aperture, outer annular portions angularly spaced around said central annular portion for providing continuous seals around said outer pipe flange apertures, and web portions joining said inner and outer annular portions, which web portions have a thickness which is less than said annular portions and, when the gasket is in operative position between two said flange components, cooperate with faces of such components to define on each side of the gasket open-ended channels which lie between the inner and each of the outer annular seals and from which fluid leaking into such channels can escape to the periphery of the flange/gasket joint via the spaces beween the angularly spaced outer annular portions of the gasket.

2. A combination of pipe flange components and sealing gasket for jointing lengths of piping of a kind comprising an inner tube for conveying a first stream of fluid and an outer tube defining with said inner tube a passageway for conveying a second stream of fluid, said combination comprising: a pair of like pipe flange components each defining a central aperture for passing a said first fluid stream, and a number of outer apertures, angularly spaced around said central aperture, for the passage of fluid of said second stream; and a sealing gasket component interposable between said flange components; said gasket having a hub portion for providing a continuous seal around the central apertures of said pipe flange components and a number of outer radially projecting annular portions integral with such hub portion and angularly spaced therearound in correspondence with the angular spacing of said outer apertures around said central aperture of each pipe flange component, each of which outer gasket portions is formed to provide a continuous seal around a registering pair of the outer apertures of said pipe flange components; said gasket component having on each side thereof and between said hub portion and each of said outer annular portions, an open-ended facial groove; said facial grooves serving when the gasket component is in operative position between said pipe flange components, to define with such components a plurality of channels for receiving fluid which leaks past said seals at regions adjacent such grooves and conducting such fluid into the spaces between said angularly spaced outer portions of the gasket component for escape to the periphery of the pipe joint.

3. A combination according to claim 2, wherein said pipe flange components have facial recesses for locating said hub portion and said outer annular portions of the gasket component and the thickness of such hub and annular portions of the gasket component is more than twice the depth of the said recesses.

* * * * *